(12) United States Patent
Herbert (10) Patent No.: US 8,992,643 B2
(45) Date of Patent: Mar. 31, 2015

(54) IMIDE CROSS-LINKED BINDERS FOR ABRASIVE ARTICLES

(75) Inventor: Charles G. Herbert, Shrewsbury, MA (US)

(73) Assignees: Saint-Gobain Abrasives, Inc., Worcester, MA (US); Saint-Gobain Abrasifs, Conflans-Sainte-Honorine ( * ) Notice: Subject to any disclaimer, the term of this patent is extended or adjusted under 35 U.S.C. 154(b) by 111 days.

(21) Appl. No.: 13/341,892

(22) Filed: Dec. 30, 2011

(65) Prior Publication Data

US 2012/0167478 A1    Jul. 5, 2012

Related U.S. Application Data

(60) Provisional application No. 61/428,775, filed on Dec. 30, 2010.

(51) Int. Cl.
```
B24B 1/00      (2006.01)
B24D 11/00     (2006.01)
B24D 3/28      (2006.01)
B24D 18/00     (2006.01)
```

(52) U.S. Cl.
CPC ...... *B24D 3/28* (2013.01); *B24D 11/00* (2013.01); *B24D 18/00* (2013.01)
USPC .............................................. 51/295; 51/298

(58) Field of Classification Search
None
See application file for complete search history.

(56) References Cited

U.S. PATENT DOCUMENTS

| | | | |
|---|---|---|---|
| 3,438,933 A * | 4/1969 | Bartsch .................... 524/572 |
| 4,293,669 A | 10/1981 | Rottmaier et al. |
| 5,108,798 A * | 4/1992 | Guerro et al. ............. 427/389.8 |
| 5,314,513 A | 5/1994 | Miller et al. |
| 5,346,947 A * | 9/1994 | Guerro et al. ................ 524/591 |
| 5,433,226 A * | 7/1995 | Burch ........................... 132/321 |
| 5,914,299 A | 6/1999 | Harmer et al. |
| 5,919,549 A | 7/1999 | Van et al. |
| 6,733,876 B1 | 5/2004 | Beardsley et al. |
| 6,935,931 B2 | 8/2005 | Prasad |
| 7,294,048 B2 | 11/2007 | Nelson et al. |
| 2003/0176592 A1* | 9/2003 | Swarup et al. ................ 525/419 |
| 2005/0065291 A1* | 3/2005 | Swarup et al. ................ 525/419 |
| 2008/0138639 A1* | 6/2008 | Swarup et al. ................ 428/500 |
| 2009/0279925 A1 | 11/2009 | Sugimoto et al. |

FOREIGN PATENT DOCUMENTS

| JP | H07-504929 A | 6/1995 |
|---|---|---|
| JP | 2001-508362 A | 6/2001 |
| JP | 2003-512186 A | 4/2003 |

(Continued)

OTHER PUBLICATIONS

Chattopadhyay, D.K. "Structural engineering of polyurethane coatings for high performance applications" Prog. Polym. Sci. 32 (2007) pp. 352-418.*
PCT/US2011/068248 International Search Report mailed Aug. 24, 2012, 1 page.

*Primary Examiner* — Kaj K Olsen
*Assistant Examiner* — Ross J Christie
(74) *Attorney, Agent, or Firm* — Joseph P. Sullivan; Abel Law Group, LLP (57) ABSTRACT

An abrasive article includes a fibrous substrate, a binder disposed on the fibrous substrate, and abrasive grains in contact with the binder. The binder includes an imide cross-linked urethane derived from a blocked isocyanate component and an anhydride component.

19 Claims, 1 Drawing Sheet (56) References Cited

FOREIGN PATENT DOCUMENTS

| JP | 2005179575 A | 7/2005 |
|----|----|----|
| JP | 2005-532176 A | 10/2005 |
| JP | 2006524584 A | 11/2006 |
| JP | 2007002054 A | 1/2007 |
| JP | 2007-290061 A | 11/2007 |
| JP | 2008-503357 A | 2/2008 |
| WO | WO2004096494 A1 | 11/2004 |

* cited by examiner

IMIDE CROSS-LINKED BINDERS FOR ABRASIVE ARTICLES

CROSS-REFERENCE TO RELATED APPLICATION(S)

The present application claims priority from U.S. Provisional Patent Application No. 61/428,775, filed Dec. 30, 2010, entitled "IMIDE CROSS-LINKED BINDERS FOR ABRASIVE ARTICLES," naming inventor Charles G. Herbert, which application is incorporated by reference herein in its entirety.

FIELD OF THE DISCLOSURE

This disclosure, in general, relates to abrasive articles including imide cross-linked binders.

BACKGROUND

Non-woven abrasive articles often include a lofty non-woven fiber web, abrasive particles and a polymeric binder securing the abrasive particles to the lofty non-woven fiber web. Conventional binders include blocked isocyanate functionalized solvent-borne urethane pre-polymer cured with aromatic amine curatives. A conventional aromatic amine curative includes methylene dianiline, a compound which has been listed as a carcinogen.

Curing of conventional binders on the production line includes the removal of solvent as well as blocking agents to complete the cure. Curing conventionally includes the application of heat. As a result, solvents, blocking agents, and to some extent amine curatives evaporate, exposing workers to potential hazards.

As such, an improved curing mechanism would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, an abrasive article includes a fibrous substrate, a binder disposed on the fibrous substrate, and abrasive grains in contact with the binder. The binder can include an imide cross-linked urethane component. In an example, the fibrous substrate includes non-woven fibrous material, such as a lofty non-woven fabric. The binder can include an imide cross-linked urethane binder derived from a blocked isocyanate component and an anhydride component. For example, the blocked isocyanate component can include a polyether block reacted with an isocyanate component, at least some of the isocyanate component forming terminal groups. A terminal isocyanate group can be blocked with an oxime or imidazole functionalized component. The anhydride component can include a maleic anhydride modified polymer. An exemplary modified polymer includes a styrenic polymer, a polyolefin, a silicone polymer, or any combination thereof. The abrasive article can be in the form of a wheel, a flap wheel, or a belt, among others.

In another exemplary embodiment, such an abrasive article can be formed by coating a fibrous substrate with a binder formulation, applying abrasive grains to the binder formulation, and curing the binder formulation. The binder formulation can include a blocked isocyanate component and an anhydride component. Upon curing, the blocked isocyanate component and the anhydride component react to form an imide cross-linked urethane binder. In a particular example, heating can facilitate the release of a blocking agent from terminal isocyanate groups of the blocked isocyanate component. The terminal isocyanate groups react with the maleic anhydride groups of the cross-linking agent to form imide functionality, resulting in imide functional cross-linking the between isocyanate components. In an example, the abrasive grains are applied separately from the binder formulation. Alternatively, the abrasive grains can be applied in a slurry including the binder formulation. In a further example, a second coating of a binder formulation can be applied over the abrasive grains and cured.

The substrate is a fibrous substrate including at least a portion formed of fibrous material. The fibrous material can include fibers in a woven, non-woven, or knitted configuration. For example, the fibers can be formed into threads or yarns, woven or knitted to form a fabric of fibrous material. In another example, the fibers are applied randomly and secured with an adhesive. For example, such a non-woven fibrous material can be a lofty non-woven fibrous material. In an example, the fibers can include natural fibers, inorganic fibers or polymeric fibers. For example, natural fibers can include cotton, wool, wood-derived fibers, or any combination thereof. Inorganic fibers include fiberglass. An exemplary polymeric fiber includes polyamide fibers, polyaramid fibers, polyester fibers, polyolefin fibers, polyacrylonitrile fibers, or any combination thereof. In a particular example, the polymeric fibers include polyamide fibers. In another example, the polymeric fibers include polyaramid fibers. In a further example, the fibers include polyester fibers. The adhesive can include a polymer such as an acrylic, a polyurethane, a vinyl acetate copolymer, or any combination thereof.

The substrate can be formed of the fibrous material, whether woven or non-woven. Alternatively, the fibrous material can be applied to a support layer such as a film, coated fabric, foam, metal substrate, or any combination thereof. The substrate can be flexible or rigid. An exemplary flexible substrate includes a polymeric film (including primed films), such as a polyolefin film (e.g., polyethylene or polypropylene, including biaxially oriented polypropylene), a polyester film (e.g., polyethylene terephthalate or a liquid crystal polymer), a polyamide film, a cellulose ester film, or any combination thereof; a metal foil; a mesh; a foam (e.g., natural sponge material or polyurethane foam); a cloth (e.g., cloth made from fibers or yarns comprising polyester, nylon, silk, cotton, poly-cotton or rayon); a paper; a vulcanized paper; a vulcanized rubber; a vulcanized fiber; a nonwoven material; or any combination thereof. A cloth substrate can be woven or stitch bonded. In particular examples, the substrate is selected from a group consisting of paper, polymer film, or a combination thereof. In other examples, the substrate includes polypropylene film or polyethylene terephthalate (PET) film.

In a particular example, the substrate is a lofty non-woven material. In an embodiment, the abrasive article can have an open structure derived from the lofty non-woven material. The open structure can include voids located between the fibers. The open structure can be at least about 25% open volume, such as at least about 40% open volume, such as at least about 55% open volume. Additionally, the open structure can be not greater than about 99% open volume, such as not greater than about 95% open volume, even not greater than about 90% open volume.

Abrasive grains are secured to the fibrous material using a binder. The abrasive grains can be formed of any one of or a combination of abrasive grains, including silica, alumina (fused or sintered), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery, or any combination thereof. For example, the abrasive grains can be selected from a group consisting of silica, alumina, zirconia, silicon carbide, silicon nitride, boron nitride, garnet, diamond, cofused alumina zirconia, ceria, titanium diboride, boron carbide, flint, emery, alumina nitride, a blend thereof, or any combination thereof. Particular examples include dense abrasive grains including principally alpha-alumina. In another example, the abrasive grains can have a Mohs hardness of at least about 8.0, such as at least about 8.5, even at least about 9.0. In particular, the abrasive grains can include super abrasive grains, such as diamond, cubic boron nitride, boron carbide, silicon carbide, or any combination thereof.

The abrasive grains can also have a particular shape. An example of such a shape includes a rod, a triangle, a pyramid, a cone, a solid sphere, a hollow sphere, or any combination thereof. Alternatively, the abrasive grain can be randomly shaped.

The abrasive grains generally have an average grain size not greater than 2000 microns, such as not greater than about 1500 microns. In another example, the abrasive grain size is not greater than about 750 microns, such as not greater than about 350 microns. For example, the abrasive grain size can be at least 0.1 microns, such as from about 0.1 microns to about 1500 microns, and more typically from about 0.1 microns to about 200 microns or from about 1 micron to about 100 microns. The grain size of the abrasive grains is typically specified to be the longest dimension of the abrasive grain. Generally, there is a range distribution of grain sizes. In some instances, the grain size distribution is tightly controlled. The abrasive grains can be in the form of individual particles, agglomerates, aggregates, or any combination thereof.

The binder securing the abrasive grains to the fibrous material can include an imide cross-linked urethane binder. In particular, such an imide cross-linked urethane binder is formed of a blocked isocyanate component and an anhydride cross-linking agent. The blocked isocyanate component can include an isocyanate terminal group blocked with a blocking agent, such as an agent including an oxime group, an imidazole group, or any combination thereof. In particular, the blocking agent can include an aliphatic component having an oxime group or imidazole functional group. An exemplary blocking agent includes an ethyl, propyl, butyl, pentyl, or hexyl backbone with an oxime or imidazole functional group. In a particular example, the blocking agent includes butyl oxime.

Further, the blocked isocyanate component can be the product of an alcohol functional component and multifunctional isocyanate components, such as di-isocyanate, tri-isocyanate, or higher functional isocyanate components. An exemplary diisocyanate monomer can include toluene diisocyanate, m-phenylene diisocyanate, p-phenylene diisocyanate, xylene diisocyanate, 4,4'-diphenylmethane diisocyanate, hexamethylene diisocyanate, isophorone diisocyanate, polymethylene polyphenyl diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, or 1,5-naphthalene diisocyanate; their modified products, for instance, carbodiimide-modified products; or the like; or any combination thereof. Such diisocyanate monomers can be used alone or in admixture of at least two kinds. In a particular example, the isocyanate component can include methylene diphenyl diisocyanate (MDI), toluene diisocyanate (TDI), hexamethylene diisocyanate (HDI), isophorone diisocyanate (IPDI), or any combination thereof. In an example, the isocyanate can include methylene diphenyl diisocyanate (MDI) or toluene diisocyanate (TDI). In particular, the isocyanate includes methylene diphenyl diisocyanate (MDI) or derivatives thereof. In another example, the isocyanate includes toluene diisocyanate (TDI) or derivatives thereof. An exemplary multifunctional isocyanate component includes triphenyl methane triisocyanate, tris(isocyanatophenyl) thiophosphate, polymethylene polyphenyl polyisocyanates, or any combination thereof.

The isocyanate component can have an average functionality in a range of about 2.0 to 2.9, such as a functionality of between 2.0 and 2.7. Further, the isocyanate component can have an NCO content in the range of 5% to 35%, such as the range of 10% to 30%.

In an example, the block isocyanate pre-polymer is the reaction product of an alcohol functional component and an excess amount of an isocyanate component, resulting in a urethane precursor terminated with isocyanate groups. In the presence of a cross-linking agent, a portion of the isocyanate groups react with the cross-linking agent, resulting in a chemically crosslinked polyurethane network.

The alcohol functional component can be a polyol component. In an example, the polyol can be a polyether polyol, a polyester polyol, modified or grafted derivatives thereof, or any combination thereof. A suitable polyether polyol can be produced by polyinsertion via double metal cyanide catalysis of alkylene oxides, by anionic polymerization of alkylene oxides in the presence of alkali hydroxides or alkali alcoholates as catalysts and with the addition of at least one initiator molecule containing 2 to 6, preferably 2 to 4, reactive hydrogen atoms in bonded form, or by cationic polymerization of alkylene oxides in the presence of Lewis acids, such as antimony pentachloride or boron fluoride etherate. A suitable alkylene oxide can contain 2 to 4 carbon atoms in the alkylene radical. An example includes tetrahydrofuran; 1,2-propylene oxide; 1,2- or 2,3-butylene oxide; ethylene oxide; 1,2-propylene oxide; or any combination thereof. The alkylene oxides can be used individually, in succession, or as a mixture. In particular, mixtures of 1,2-propylene oxide and ethylene oxide can be used, whereby the ethylene oxide is used in quantities of 10% to 50% as an ethylene oxide terminal block so that the resulting polyols display over 70% primary OH terminal groups. An example of an initiator molecule includes water or dihydric or trihydric alcohols, such as ethylene glycol, 1,2-propanediol and 1,3-propanediol, diethylene glycol, dipropylene glycol, ethane-1,4-diol, glycerol, trimethylol propane, or any combination thereof.

Suitable polyether polyols, such as polyoxypropylene polyoxyethylene polyols, have average functionalities of 1.5 to 4, such as 2 to 3, and number-average molecular weights of 800 g/mol to 25,000 g/mol, such as 800 g/mol to 14,000 g/mol, particularly 2,000 g/mol to 9,000 g/mol.

In another example, the polyol can include a polyester polyol. In an example, a polyester polyol is derived from dibasic acids such as adipic, glutaric, fumaric, succinic or maleic acid, or anhydrides and di-functional alcohols, such as ethylene glycol, diethylene glycol, propylene glycol, di or tripropylene glycol, 1-4 butane diol, 1-6 hexane diol, or any combination thereof. For example, the polyester polyol can be formed by the condensation reaction of the glycol and the acid with the continuous removal of the water by-product. A small amount of high functional alcohol, such as glycerin, trimethanol propane, pentaerythritol, sucrose or sorbitol or polysaccharides can be used to increase branching of the polyester polyol. The esters of simple alcohol and the acid can be used via an ester interchange reaction where the simple alcohols are removed continuously like the water and replaced by one or more of the glycols above. Additionally, polyester polyols can be produced from aromatic acids, such as terephthalic acid, phthalic acid, 1,3,5-benzoic acid, their anhydrides, such as phthalic anhydride. In a particular example, the polyol can include an alkyl diol alkyl ester. For example, the alkyl diol alkyl ester can include trimethyl pentanediol isobutyrate, such as 2,2,4-trimethyl-1,3-pentanediol isobutyrate.

In a particular example, the polyol can be a multifunctional polyol having at least two primary hydroxyl groups. For example, the polyol can have at least three primary hydroxyl groups. In a particular example, the polyol is a polyether polyol having an OH number in the range of 5 mg KOH/g to 70 mg KOH/g, such as a range of 10 mg KOH/g to 70 mg KOH/g, a range of 10 mg KOH/g to 50 mg KOH/g, or even 15 mg KOH/g to 40 mg KOH/g. In a further example, the polyether polyol can be grafted. For example, the polyol can be a polyether polyol grafted with styrene-acrylonitrile. In a further example, the polyol can include a blend of multifunctional, such as trifunctional polyether polyols, and polyols that are grafted, such as a polyether polyol having a grafted styrene-acrylonitrile moiety. In particular, the polyol is a polyether polyol, available under the trade name Lupranol® available from Elastogran by BASF Group.

In addition, the binder formulation can include a catalyst. The catalyst can include an organometallic catalyst, an amine catalyst, or a combination thereof. An organometallic catalyst, for example, can include dibutyltin dilaurate, a lithium carboxylate, tetrabutyl titanate, a bismuth carboxylate, or any combination thereof. The amine catalyst can include a tertiary amine, such as tributylamine, N-methyl morpholine, N-ethyl morpholine, N,N,N',N'-tetramethyl ethylene diamine, pentamethyl diethylene triamine and higher homologues, 1,4-diazabicyclo-[2,2,2]-octane, N-methyl-N'-dimethylaminoethyl piperazine, bis(dimethylaminoalkyl) piperazine, N,N-dimethyl benzylamine, N,N-dimethyl cyclohexylamine, N,N-diethyl benzylamine, bis(N,N-diethylaminoethyl) adipate, N,N,N',N'-tetramethyl-1,3-butane diamine, N,N-dimethyl-β-phenyl ethylamine, bis(dimethylaminopropyl) urea, bis(dimethylaminopropyl) amine, 1,2-dimethyl imidazole, 2-methyl imidazole, monocyclic and bicyclic amidine, bis (dialkylamino) alkyl ether, such as e.g., bis(dimethylaminoethyl) ethers, tertiary amines having amide groups (such as formamide groups), or any combination thereof. Another example of a catalyst component includes Mannich bases including secondary amines, such as dimethylamine, or aldehyde, such as formaldehyde, or ketone such as acetone, methyl ethyl ketone or cyclohexanone or phenol, such as phenol, nonyl phenol or bisphenol. A catalyst in the form of a tertiary amine having hydrogen atoms that are active with respect to isocyanate groups can include triethanolamine, triisopropanolamine, N-methyldiethanolamine, N-ethyl diethanolamine, N,N-dimethyl ethanolamine, reaction products thereof with alkylene oxides such as propylene oxide or ethylene oxide, or secondary-tertiary amines, or any combination thereof. Silamines with carbon-silicon bonds can also be used as catalysts, for example, 2,2,4-trimethyl-2-silamorpholine, 1,3-diethyl aminomethyl tetramethyl disiloxane, or any combination thereof.

The blocked isocyanate urethane component can be cross-linked with an anhydride cross-linking agent. In an example, the anhydride cross-linking agent includes a maleic anhydride modified polymer. An exemplary polymer to be modified includes a styrenic polymer, a polyolefin, a diene elastomer, a vinyl ether polymer, ethylene vinyl acetate copolymer, an acrylic polymer, polyether polymer, a polyester polymer, a silicone, or any combination thereof. An exemplary polyolefin includes a polyolefin homopolymer, such as polyethylene, polypropylene, polybutene, polypentene, or polymethylpentene; a polyolefin copolymer, such as ethylene-propylene copolymer, ethylene-butene copolymer, or ethylene-octene copolymer; or any blend thereof; or any combination thereof.

A diene elastomer is a cross-linkable copolymer derived from a diene monomer, for example, ethylene propylene diene monomer (EPDM), acrylonitrile butadiene styrene terpolymer (ABS), or any combination thereof. An exemplary diene monomer includes a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclicene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo $(5,2,1,0^2,6)$-deca-3,8-diene or the like; or any combination thereof. In a particular embodiment, the diene includes a non-conjugated diene. In another embodiment, the diene elastomer includes alkenyl norbornene.

An exemplary acrylic polymer includes a polymer derived from a (meth)acrylate (i.e., acrylate or methacrylate) functional monomer. An exemplary monomers include methacrylate, acrylate, ethyl(meth)acrylate, methyl(meth)acrylate, propyl(meth)acrylate, butyl(meth)acrylate, acrylamide, N,N-dimethylacrylamide, (meth)acryloylmorpholine, 7-amino-3,7-dimethyloctyl(meth)acrylate, isobutoxymethyl(meth) acrylamide, isobornyloxyethyl(meth)acrylate, isobornyl (meth)acrylate, 2-ethylhexyl(meth)acrylate, ethyldiethylene glycol(meth)acrylate, t-octyl(meth)acrylamide, diacetone (meth)acrylamide, dimethylaminoethyl(meth)acrylate, diethylaminoethyl(meth)acrylate, lauryl(meth)acrylate, dicyclopentadiene(meth)acrylate, dicyclopentenyloxyethyl (meth)acrylate, dicyclopentenyl(meth)acrylate, N,N-dimethyl(meth)acrylamidetetrachlorophenyl(meth)acrylate, 2-tetrachlorophenoxyethyl (meth)acrylate, tetrahydrofurfuryl(meth)acrylate, tetrabromophenyl(meth)acrylate, 2-tetrabromophenoxyethyl(meth)acrylate, 2-trichlorophenoxyethyl (meth)acrylate, tribromophenyl (meth)acrylate, 2-tribromophenoxyethyl(meth)acrylate, 2-hydroxyethyl (meth)acrylate, 2-hydroxypropyl(meth)acrylate, vinylcaprolactam, N-vinylpyrrolidone, phenoxyethyl(meth)acrylate, butoxyethyl(meth)acrylate, pentachlorophenyl(meth)acrylate, pentabromophenyl(meth)acrylate, polyethylene glycol mono(meth)acrylate, polypropylene glycol mono(meth) acrylate, bornyl(meth)acrylate, methyltriethylene diglycol (meth)acrylate, or any combination thereof. In particular the acrylate polymer can be derived from methacylate, acrylate, ethyl(meth)acrylate, methyl(meth)acrylate, propyl(meth)acrylate, butyl(meth)acrylate, copolymers thereof, or any combination thereof. In a further example, the acrylic polymer can includes copolymer of a polyacrylate and polymethacrylate, a polyacrylate and ethylene methacrylate copolymer ("EMAC") (such as Chevron Chemicals EMAC 2260), or a polyacrylate and ethylene butylacrylate ("EBAC").

An exemplary silicone includes polyalkylsiloxane with a functionalized terminal group. An exemplary polyalkylsiloxane is formed of a precursor, such as dimethylsiloxane, diethylsiloxane, dipropylsiloxane, methylethylsiloxane, methylpropylsiloxane, methylphenylsiloxane, fluorinated derivatives thereof, or any combination thereof. In a particular example, the polyalkylsiloxane can be terminated with a maleic anhydride functional group.

In a further example, the polymer is a polyester, such as polyethylene terephthalate. In another example, the polyester is a liquid crystal polymer. An exemplary liquid crystal polymer includes aromatic polyester polymers, such as those available under tradenames XYDAR® (Amoco), VECTRA® (Hoechst Celanese), SUMIKOSUPER™ (Sumitomo Chemical), EKONOL™ (Saint-Gobain), DuPont HX™ or DuPont ZENITE™ (E.I. DuPont de Nemours), RODRUN™ (Unitika), GRANLAR™ (Grandmont), or any combination thereof. An exemplary polyether includes polyoxymethylene, polyethylene glycol, polypropylene glycol, polytetramethylene glycol, or any combination thereof. An exemplary styrenic polymer includes a polymer having at least one block of polystyrene, such as such as polystyrene, acrylonitrile butadiene styrene copolymer (ABS), styrene-butadiene (SB), styrene-butadiene-styrene (SBS), styrene-isoprene-styrene (SIS), styrene-isoprene (SI), styrene-ethylene-butylene-styrene (SEBS), styrene-ethylene-butylene (SEB), styrene-ethylene-propylene-styrene (SEPS), isoprene-isobutylene rubbers (IIR), styrene-ethylene-propylene (SEP), or any combination thereof.

In particular, the maleic anhydride modified polymer can include a silicone component. In another example, the maleic anhydride modified polymer includes a styrenic polymer component. In a further example, the maleic anhydride modified polymer includes a polyolefin component.

The anhydride cross-linking agent can be included in the binder formulation in an amount of 0.001 wt % to 20 wt % based on the weight of the isocyanate component. For example, the anhydride cross-linking agent can be included in an amount of 0.005 wt % to 10 wt % based on the weight of the isocyanate component, such as 0.005 wt % to 7 wt %, 0.01 wt % to 5 wt %, or even 0.1 wt % to 5 wt % based on the weight of the isocyanate component.

The binder formulation can further include fillers, solvents, plasticizers, chain transfer agents, catalysts, stabilizers, dispersants, curing agents, reaction alleviators, or agents for influencing the fluidity of the dispersion. Further, the binder formulation can include an antistatic agent, such as graphite, carbon black, or any combination thereof. In another example, the binder formulation can include a suspending agent, such as fumed silica. In another example, the binder formulation can include an anti-loading agent, such as metal stearate, for example, zinc, calcium, lithium or magnesium stearate, or any combination thereof. In an additional example, the binder formulation can include a lubricant, such as a wax. Further, the binder formulation can include wetting agents, dyes, fillers, viscosity modifiers, defoamers, or any combination thereof.

Once applied to the fibrous material, the binder formulation can be cured to form an imide cross-linked urethane binder that secures the abrasive grains to the fibrous material. In particular, curing can include heating the binder formulation. For example, heating can facilitate the release of the blocking agent from the terminal isocyanate group, which reacts with the maleic anhydride group of the cross-linking agent to form imide functionality, resulting in imide functional cross-linking the between urethane prepolymers.

Once cured, the binder can have desirable properties, such as chemical and mechanical properties. For example, the binder can have a storage modulus measured at 35° C. in a range of 0.5 MPa to 20 MPa. For example, the storage modulus can be in a range of 1 MPa to 15 MPa, such as range of 1.5 MPa to 12 MPa. In a particular example, the storage modulus is in a range of 1.5 MPa to 5 MPa. In an alternative example, the storage modulus is in a range of 6 MPa to 12 MPa.

Further, the binder can exhibit desirable thermal mechanical properties. For example, when tested with a thermal mechanical analysis (TMA) probe, the binder can exhibit a probe height of at least 60% at a temperature greater than 200° C. For example, the probe can be at a height of 60% at a temperature of at least 210° C., such as a temperature of at least 235° C., or even at least 250° C. In particular, the probe height can be not greater than 60% at temperatures greater than 350° C.

Further, the binder can have a desirable glass transition temperature. For example, the glass transition temperature can be at least −20° C., such as at least −15° C., or even at least −5° C.

In another example, the binder can exhibit a desirable König pendulum hardness, such as in a range of 15 to 170, such as in a range of 15 to 160. For example, the König pendulum hardness can be at least 15 oscillations, such as at least 35 oscillations, at least 40 oscillations, at least 50 oscillations, or even at least 75 oscillations. In particular, the König pendulum hardness can be not greater than 170 oscillations, such as not greater than 160 oscillations. Further, the binder can exhibit a desirable Knoop hardness in a range of 20 $kg/mm^2$ to 80 $kg/mm^2$.

In addition, the binder can exhibit a desirable mechanical property, such as elongation-at-break. For example, the binder can exhibit an elongation of at least 200%, such as at least 300%, or even at least 400%.

Figures 1, 2:
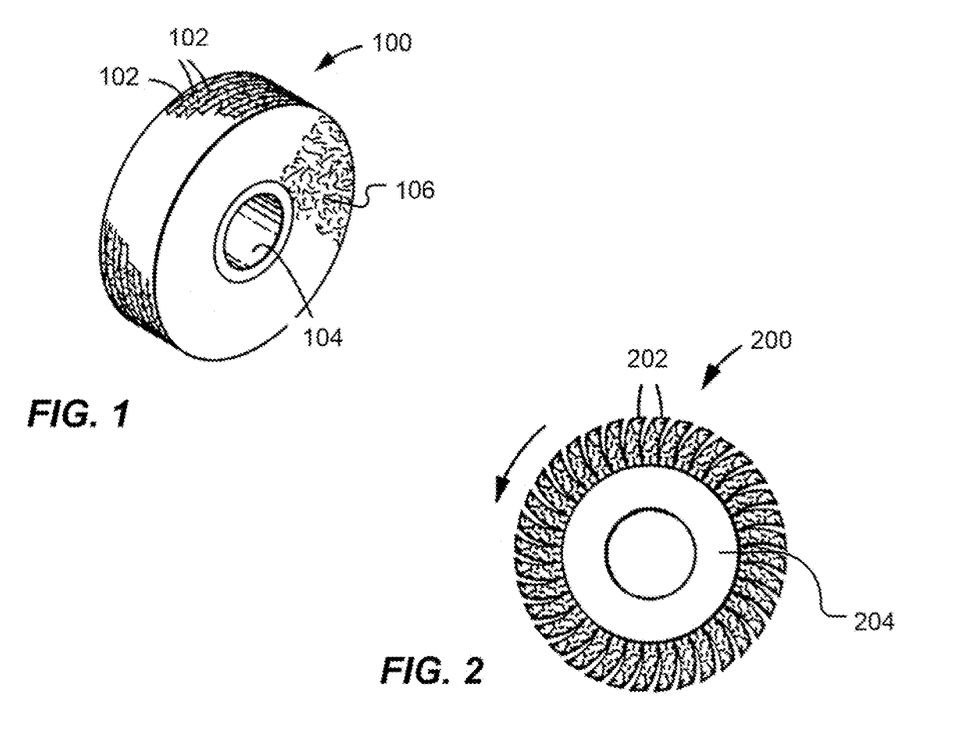
FIG. 1 and FIG. 2 include illustrations of exemplary abrasive wheels.

In particular, the abrasive article can be in the form of a wheel, a flap wheel, or a belt. For example, as illustrated in FIG. 1, a wheel 100 includes one or more layers 102 of a non-woven fabric secured with a central dowel 104. The fibers 106 of the non-woven layers 102 can be coated with abrasive grains secured to the fibers with a binder including an imide cross-linked urethane component.

In another example, as illustrated in FIG. 2, an abrasive article 200 including flaps 202 secured to a central support 204. The flaps 202 can include fibrous material coated with a binder securing abrasive grains to the fibrous material. The binder can include an imide cross-linked urethane component.

Figure 3:
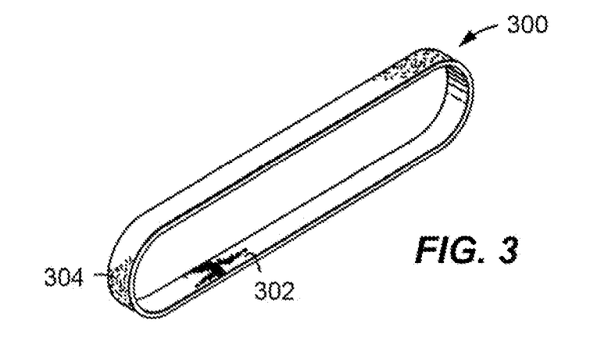
FIG. 3 includes an illustration of an exemplary abrasive belt.

In a further example, an abrasive belt 300 is illustrated in FIG. 3 that includes a substrate 302. Fibers 304 are disposed on the substrate 302. Abrasive grains are secured to the fibers 304 with a binder including an imide cross-linked urethane component.

The abrasive article can be formed by dispensing a substrate including a fibrous material, coating the fibrous material with the binder formulation, depositing abrasive grains to contact the binder formulation, and curing the binder formulation. In a particular example, the substrate includes a non-woven fibrous material. The non-woven fibrous material can be formed by randomly depositing fibers over a carrier and coating the fibers with an adhesive. The adhesive, such as an acrylic, urethane, or vinyl acetate adhesive, secures the fibers together forming a lofty non-woven fibrous material. Optionally, the fibrous material can be secured to a support layer. In another example, the fibrous material can be cut into slabs for further treatment.

The substrate including the non-woven fibrous material can be dispenses for coating with a binder formulation. For example, the non-woven fibrous material can be coated with a binder formulation, such as through spray coating, dip coating, or any combination thereof. Excess binder formulation can be drained from the non-woven fibrous material. In particular, the binder formulation includes a blocked isocyanate component and an anhydride cross-linking agent.

In addition, abrasive grains can be deposited to contact the binder formulation. In an example, a slurry can be formed of the binder formulation and abrasive grains, and the slurry coated on to the non-woven fibrous material. In such an example, depositing the abrasive grains and coating the binder formulation occurs simultaneously. In another example, the abrasive grains can be deposited following coating of the binder formulation on the non-woven fibrous material. In a further example, the abrasive grains can be deposited before coating with the binder formulation.

After the abrasive grains are disposed in contact with the binder formulation, the binder formulation can be cured to form an imide cross-linked urethane binder. In a further example, the non-woven fibrous material can be coated with a subsequent binder formulation following application of the abrasive grains In an example, the subsequent binder formulation includes a blocked isocyanate component and an anhydride cross-linking agent. The second binder formulation can be cured to form an imide cross-linked urethane binder. As such, the binder formulation can be used as a make coat, can be used as a size coat, or both relative to the abrasive grains. In another example, the binder formulation can be used in other coatings, such as a super size coat.

The coated fibrous material can be cut or shaped to form the abrasive product. For example, the coated fibrous material can be cut into a circular shape to form a wheel. In another example, the fibrous material can be stacked to form a multilayer product or wound into a convolute wheel. In another example, the coated fibrous material can be cut into flaps that are assembled to form the abrasive product.

Once formed, the abrasive product can be placed in contact with a surface of a workpiece to be abraded and moved relative to the surface to effect a desired surface property or material removal. For example, the abrasive product can be attached to a sander or other mechanical device and placed in contact with a workpiece. When activated, the sander or other mechanical device can move the abrasive product relative to the workpiece, such as with an oscillating motion, in a circular motion, or both, to facilitate abrading. In another example, the abrasive article can be used as a hand-held hand pad abrasive article. In further examples, the abrasive article can be a flat cut disc abrasive article, a unified wheel abrasive article, a flap wheel abrasive article, a depressed center wheel abrasive article, a convolute wheel abrasive article, abrasive belts, a center-less abrasive article, or a rolled abrasive article for dispensing for hand sanding or jitterbug usage.

EXAMPLES

Example 1

Samples of binder formulation are prepared and tested for König pendulum hardness.

Control Sample 1: A 13.5% solids solution of methylene dianiline in methyl ethyl ketone (MEK) is added to a mixture of Adiprene BL-16 (Chemtura) and Adiprene BL-40 (Chemtura) in the proportions of 51.3 grams of diamine to 35.0 g and 15.0 g, respectively for BL-16 and BL-40. The solution is cast onto a glass plate at a thickness of 4 mil wet and is dried 20.5 hours at 250° F.

Imide Cross-linked Sample 1: A sample of 0.14 g of SMA 1000 (Cray Valley) is added to 25 g of MEK and 24.9 g of Adiprene BLM-500. A film of the resultant binder mixture is prepared and cured as described in relation to the Control Sample.

Imide Cross-linked Sample 2: A sample of 2.53 g of Ricon 131MA (Cray Valley) in MEK is added to 10.6 g of methyl isobutyl ketone (MIBK) and 26.2 g of Adiprene BL-40. A film of the resultant binder mixture is prepared and is cured as described in relation to the Control Sample.

Imide Cross-linked Sample 3: A 15.6% solids solution of Gantrez AN-119 (International Specialty Products) is added in the proportion of 28.4 g to 21.7 g of Adiprene BLM-500 (Chemtura). A film of the resultant binder mixture is prepared and is cured as described in relation to the Control Sample.

Imide Cross-linked Sample 4: A sample of 11.28 g of SMA 1000 (Cray Valley) is added to 11.3 g of MEK and 11.3 g MIBK followed by 16.2 g of Adiprene BL-40. A film of the resultant binder mixture is prepared and is cured as described in relation to the Control Sample.

As illustrated in Table 1, the imide cross-linked examples exhibit increased König pendulum hardness relative to the control example.

TABLE 1

König pendulum hardness of Samples

| Sample | König pendulum hardness |
|---|---|
| Control 1 | 31 |
| 1 | 43 |
| 2 | 33 |
| 3 | 41 |
| 4 | 110 |

Example 2

Lofty non-woven samples consisting of nylon fiber (a 1:1 blend of 500 Denier 2.5" and 200 Denier 2") are prepared using a binder weight of 4.4 lb/ream and fiber weight of 35.6 lb/ream. The backing binder consists of 39 parts of Hycar 26138, 0.2 parts Triton X-100, 1.5 parts melamine resin, and 59.3 parts water, which is cured on the production line and cut into 11"×11" squares. Pre-size coats are prepared containing 270 lb/ream of grain and 20 lb/ream of grams binder. The grain content consists of 70% A2-60 and 30% HiPal 60. The pre-size is dried 10 minutes at 325° F. A size coat is then applied at a coat weight of 450 lb/ream and is dried 6 hours at 260° F. followed by 14 hours at 210° F. The polyurethane-imide samples are prepared using the same backing, grain percentage and grain composition, as well as the same cure conditions. The compositions of the respective binders are tabulated below in Table 2 and Table 3.

TABLE 2

Pre-size Coat Composition

| Component | Control Sample 2 (wt %) | Imide Sample 5 (wt %) | Imide Sample 6 (wt %) |
|---|---|---|---|
| MEK | 8.0 | 33.61 | 7.88 |
| MDA for BL-40 | 5.8 | | |
| MDA for BL-16 | 2.0 | | |
| MIBK | 20.7 | | 20.4 |
| Adiprene BL-40 (73%) | 40.0 | | 57.15 |
| Adiprene BL-16 (17%) | 16.0 | | |
| Adiprene BLM-500 | | 58.56 | |
| Lithium Stearate | 3.0 | 3.0 | 3.0 |
| Titanox 2030 | 1.0 | 1.0 | 1.0 |
| Orange Dispersion | 3.4 | 3.4 | 3.4 |
| Niax A-575 | 0.1 | 0.1 | 0.1 |
| SMA 1000P | | 0.32 | |
| Ricon 131MA20 | | | 7.07 |
| Total | 100.0 | 100.0 | 100.0 |
| Solids (%) | 56.1 | 63.9 | 53.8 |

TABLE 3

Size Coat Composition

| Component | Control Sample 2 (wt %) | Imide Sample 5 (wt %) | Imide Sample 6 (wt %) |
|---|---|---|---|
| MEK | 9.2 | 32.31 | 7.88 |
| MDA for BL-40 | 7.1 | | |
| MDA for BL-16 | 2.3 | | |
| MIBK | 5.0 | | 22.70 |
| Adiprene BL-40 (73%) | 49.4 | | 14.61 |
| Adiprene BL-16 (17%) | 18.2 | | 40.92 |
| Adiprene BLM-500 | | 58.56 | |
| Lithium Stearate | 4.0 | 4.0 | 4.0 |
| Orange Dispersion | 2.0 | 2.0 | 2.0 |
| Disparion | 2.7 | 2.7 | 2.7 |
| Niax A-575 | 0.1 | 0.1 | 0.1 |
| SMA 1000P | | 0.32 | |
| Ricon 131MA20 | | | 5.06 |
| Total | 100.0 | 100.0 | 100.0 |
| Solids (%) | 68.9 | 66.3 | 59.1 |

Wheels are cut at a 4.5" diameter from the sample slabs. The wheel produced from imide cross-linked Sample 5 is more flexible than the Control Sample 2, while Sample 6 is very flexible relative to the other respective wheel samples. The imide cross-linked Sample 5 wheel is able to remove the surface of a carbon steel work-piece under 5 lb of pressure at 6000 rpm, while the imide cross-linked wheel from Sample 6 does not survive at 600 rpm. The Control Sample 2 removes the surface under a pressure of 10 lb.

In a first embodiment, an abrasive article includes a fibrous substrate, a binder disposed on the fibrous substrate, and abrasive grains in contact with the binder. The binder includes an imide cross-linked urethane component.

In an example of the first embodiment, the imide cross-linked urethane component is derived from a blocked isocyanate component and an anhydride component. For example, the blocked isocyanate component can include a polyether block. In another example, the blocked isocyanate component can include a polyester-ether block. In an additional example, the anhydride component is a maleic anhydride modified polymer. In particular, the maleic anhydride modified polymer can include a styrenic polymer, a polyolefin, a diene elastomer, a vinyl ether polymer, an ethylene-vinyl acetate copolymer, an acrylic polymer, a polyether, a polyester, silicone, or any combination thereof. For example, the maleic anhydride modified polymer can include silicone. In another example, the maleic anhydride modified polymer includes a styrenic polymer. In an additional example, the maleic anhydride modified polymer includes acrylic polymer.

In a further example of the first embodiment, the binder forms a make coat. In another example, the binder forms a size coat or the binder forms a supersize coat.

In an additional example of the first embodiment, the abrasive grains include silica, alumina (fused or sintered), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery, or any combination thereof. In a further example, the abrasive grains have an average particle size in a range of 0.1 microns to 1500 microns.

In another example of the first embodiment, the binder further includes an anti-loading agent, such as a metal stearate. In a further example, the binder includes a viscosity modifier. In an additional example, the binder includes a suspending agent.

In a further example of the first embodiment, the fibrous substrate is a non-woven substrate. In another example, the fibrous substrate includes fibers bound by a second binder. In an additional example, the fibers include inorganic fibers. In a further example, the fibers include polymeric fibers. For example, the polymeric fibers include polyamide. In another example, the second binder includes an acrylic, polyurethane, a vinyl acetate, or any combination thereof.

In an additional example of the first embodiment, the binder has a storage modulus in a range of 0.5 MPa to 20 MPa. In a further example, the binder has a TMA probe depth of at least 60% at 200° C. In another example, the binder has a glass transition temperature of at least −20° C. In a further example, the binder has a König pendulum hardness in a range of 15 oscillations to 160 oscillations. In an another example, the binder has an elongation of at least 200%. In an additional example, the binder has a Knoop hardness in a range of 20 kg$_f$/mm$^2$ to 80 kg$_f$/mm$^2$.

In another example of the first embodiment, the abrasive article is in the form of a wheel. In a further example, the abrasive article is in the form of flaps. In an additional example, the abrasive article is in the form of a belt.

In a second embodiment, an abrasive article includes a non-woven fibrous material including fibers secured together with a first binder; abrasive grains disposed on the non-woven fibrous material and secured to the non-woven fibrous material with a second binder, and the second binder comprising an imide cross-linked urethane component derived from a blocked isocyanate component and an anhydride component.

In an example of the second embodiment, the first binder includes an acrylic, polyurethane, a vinyl acetate, or any combination thereof, while the blocked isocyanate component comprises a polyether block. In another example, the blocked isocyanate component comprises a polyester-ether block.

In a further example of the second embodiment, the anhydride component is a maleic anhydride modified polymer. For example, the maleic anhydride modified polymer can include a styrenic polymer, a polyolefin, a diene elastomer, a vinyl ether polymer, an ethylene-vinyl acetate copolymer, an acrylic polymer, a polyether, a polyester, silicone, or any combination thereof. In a particular example, the maleic anhydride modified polymer includes silicone. In another example, the maleic anhydride modified polymer includes a styrenic polymer. In an additional example, the maleic anhydride modified polymer includes acrylic polymer.

In another example of the second embodiment, the fibers include inorganic fibers. For example, the fibers can include polymeric fibers. In an example, the polymeric fibers include polyamide. In a further example, the second binder includes an acrylic, polyurethane, vinyl acetate, or any combination thereof.

In a third embodiment, a method of forming an abrasive article includes dispensing a substrate including non-woven fibrous material and coating the non-woven fibrous material with a binder formulation. The binder formulation includes a blocked isocyanate component and an anhydride crosslinking agent. In addition, the method includes depositing abrasive grains to contact the binder formulation and curing the binder formulation to form an imide crosslinked urethane binder.

In an example of the third embodiment, the method further includes forming a slurry including the binder formulation and the abrasive grains, wherein coating and depositing occur simultaneously by coating the non-woven fibrous material with the slurry. In an additional example, coating occurs prior to depositing.

In another example of the third embodiment, the method further includes shaping an abrasive article from the substrate after curing the binder formulation.

In an additional example of the third embodiment, the method further includes forming the substrate by randomly depositing fibrous material and coating the fibrous material with a second binder.

In a further example of the third embodiment, the method further includes coating a second binder formulation over the deposited abrasive grains and curing the second binder formulation. In an additional example, the second binder formulation includes a blocked isocyanate component and an anhydride crosslinking agent.

In a fourth embodiment, a method of polishing a workpiece includes contacting an abrasive article to a surface of a workpiece. The abrasive article includes a fibrous substrate, and a binder disposed on the fibrous substrate. The binder includes an imide cross-linked urethane derived from a blocked isocyanate component and an anhydride component. The method further includes abrasive grains in contact with the binder and moving the abrasive article relative to the workpiece while in contact with the surface.

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An abrasive article comprising:
   a fibrous substrate;
   a binder disposed on the fibrous substrate, the binder comprising an imide cross-linked urethane component; and
   abrasive grains in contact with the binder,
   wherein the imide cross-linked urethane component is derived from a blocked isocyanate component and an anhydride component, and
   wherein the anyhydride component is a maleic anhydride modified polymer.

2. The abrasive article of claim 1, wherein the blocked isocyanate component comprises an oxime group, an imidazole group, or a combination thereof.

3. The abrasive article of claim 2, wherein the blocked isocyanate component comprises a polyether block.

4. The abrasive article of claim 2, wherein the blocked isocyanate component comprises a polyester-ether block.

5. The abrasive article of claim 2, wherein the maleic anhydride modified polymer includes a styrenic polymer, a polyolefin, a diene elastomer, a vinyl ether polymer, an ethylene-vinyl acetate copolymer, an acrylic polymer, a polyether, a polyester, silicone, or any combination thereof.

6. The abrasive article of claim 1, wherein the binder further comprising a viscosity modifier.

7. The abrasive article of claim 1, wherein the binder further comprising a suspending agent.

8. The abrasive article of claim 1, wherein the fibrous substrate is a non-woven substrate.

9. The abrasive article of claim 1, wherein the fibrous substrate includes fibers bound by a second binder.

10. The abrasive article of claim 9, wherein the second binder includes an acrylic, polyurethane, a vinyl acetate, or any combination thereof.

11. The abrasive article of claim 1, wherein the binder has a Knoop hardness in a range of 20 $kg_f/mm^2$ to 80 $kg_f/mm^2$.

12. An abrasive article comprising:
    a non-woven fibrous material including fibers secured together with a first binder;

abrasive grains disposed on the non-woven fibrous material and secured to the non-woven fibrous material with a second binder; and the second binder comprising an imide cross-linked urethane component derived from a blocked isocyanate component and an anhydride component, wherein the anhydride component is maleic anhydride modified polymer.

13. A method of forming an abrasive article, the method comprising:

dispensing a substrate including non-woven fibrous material;

coating the non-woven fibrous material with a binder formulation, the binder formulation including a blocked isocyanate component and an anhydride crosslinking agent, wherein the anhydride crosslinking agent comprises a maleic anhydride modified polymer;

depositing abrasive grains to contact the binder formulation; and curing the binder formulation to form an imide crosslinked urethane binder.

14. The method of claim 13, further comprising forming a slurry including the binder formulation and the abrasive grains, wherein coating and depositing occur simultaneously by coating the non-woven fibrous material with the slurry.

15. The method of claim 13, wherein coating occurs prior to depositing.

16. The method of claim 13 further comprising shaping an abrasive article from the substrate after curing the binder formulation.

17. The method of claim 13, further comprising forming the substrate by randomly depositing fibrous material and coating the fibrous material with a second binder.

18. The method of claim 13, further comprising coating a second binder formulation over the deposited abrasive grains and curing the second binder formulation.

19. The method of claim 18, wherein the second binder formulation includes a blocked isocyanate component and an anhydride crosslinking agent.

* * * * *